(12) United States Patent
Henriksson et al.

(10) Patent No.: US 8,243,659 B2
(45) Date of Patent: Aug. 14, 2012

(54) DVB LOW BIT RATE SERVICES

(75) Inventors: Jukka Henriksson, Espoo (FI); Jussi Vesma, Turku (FI); Jani Väre, Kaarina (FI); Harri J. Pekonen, Raisio (FI); Tommi Auranen, Turku (FI); Pekka Talmola, Turko (FI)

(73) Assignee: Nokia Corporation, Espoo (FI)

( * ) Notice: Subject to any disclaimer, the term of this patent is extended or adjusted under 35 U.S.C. 154(b) by 1405 days.

(21) Appl. No.: 11/686,661

(22) Filed: Mar. 15, 2007

(65) Prior Publication Data

US 2008/0225900 A1  Sep. 18, 2008

(51) Int. Cl.
   *H04W 4/00* (2009.01)
(52) U.S. Cl. ......... 370/329; 370/543; 370/328; 370/230
(58) Field of Classification Search .......... 370/543, 370/329, 230, 328
   See application file for complete search history.

(56) References Cited

U.S. PATENT DOCUMENTS

| | | | | |
|---|---|---|---|---|
| 5,128,934 | A * | 7/1992 | Jasinski | 370/312 |
| 2001/0012303 | A1 | 8/2001 | Gruse et al. | |
| 2001/0019541 | A1* | 9/2001 | Jou et al. | 370/311 |
| 2002/0105903 | A1* | 8/2002 | Takahashi et al. | 370/208 |
| 2004/0058641 | A1* | 3/2004 | Acker | 455/3.02 |
| 2005/0013277 | A1* | 1/2005 | Marque-Pucheu | 370/336 |
| 2006/0023666 | A1* | 2/2006 | Jalali et al. | 370/334 |
| 2006/0030378 | A1* | 2/2006 | Jarvi et al. | 455/575.1 |
| 2006/0041638 | A1* | 2/2006 | Whittaker et al. | 709/219 |
| 2006/0165157 | A1* | 7/2006 | Griffin et al. | 375/147 |
| 2006/0246836 | A1* | 11/2006 | Simon | 455/3.01 |
| 2007/0116055 | A1* | 5/2007 | Atsumi et al. | 370/476 |
| 2007/0165728 | A1* | 7/2007 | Parizhsky et al. | 375/260 |
| 2007/0242765 | A1* | 10/2007 | Parizhisky et al. | 375/260 |

FOREIGN PATENT DOCUMENTS

EP 1693981 A2 8/2006

OTHER PUBLICATIONS

Digital Video Broadcasting (DVB); DVB-H Implementation Guidelines, ETSI TR 102 377 V1.2.1 (Nov. 2005), Technical Report.
Office Action in related Chinese Application No. 20088000845565, Aug. 3, 2010.
International Search Report for PCT/IB2008/000720, dated Jan. 12, 2009, pp. 1-3.
Notification of the Second Office Action in CN2008800084565 dated Dec. 26, 2011, with English translation.

* cited by examiner

*Primary Examiner* — Dwayne Bost
*Assistant Examiner* — Edward Zhang
(74) *Attorney, Agent, or Firm* — Banner & Witcoff, Ltd.

(57) ABSTRACT

The invention is directed to efficient transfer of low bit rate services in a communication system. A synchronization symbol which has known characteristics may be included as a first symbol of digital broadcast frames. The synchronization symbol, which can be decoded without having to resort to trial and error methods, contains parameters for the rest of the signal. Low bit rate services are allocated to time slots following the pilot symbol used for synchronization allowing for fast access times with maximum power saving capabilities. A user terminal wakes up just before the synchronization symbol and received the data allocated for the low bit rate services. The user terminal may power off for the remaining time slots which are allocated for higher bit services to conserve power.

26 Claims, 8 Drawing Sheets

DVB LOW BIT RATE SERVICES

FIELD OF THE INVENTION

The invention relates generally to communications networks. More specifically, the invention relates to efficient transfer of low bit rate services in a communication system.

BACKGROUND

Digital broadband broadcast networks enable end users to receive digital content including video, audio, data, and so forth. Using a terminal, a user may receive digital content over a wireless digital broadcast network. Digital content may be transmitted in a cell within a network. A cell may represent a geographical area that may be covered by a transmitter in a communication network. A network may have multiple cells and cells may be adjacent to other cells. A terminal device, such as a mobile terminal, may receive a program or service in a data or transport stream.

For example, end users may receive program or service information such as a broadcast program in a data stream for example via an IP Datacast (IPDC) over a broadcast network. In addition, IP Datacast also defines an Electronic Service Guide (ESG) which is used to provide information to the user DVB (Digital Video Broadcast) networks may carry multiple transport streams. Each transport stream may carry a multiplex of DVB services. A multiplex may be defined by the ID of the network of origin and the carrying transport stream ID. A DVB service may be composed of components, each of which is transported in an Elementary Stream (ES). A service component may be identified by the service ID and a PID or alternatively by the sources and destination IP addresses of the corresponding IP streams.

One of the design decisions of DVB standards includes the use of time slicing. Time slicing is used to reduce power consumption of the receiver by sending bursts of the service at a high bit rate corresponding to the multiplex bit rate (or part of it) and allowing the terminal to turn "off" the receiver for the period of time between two consecutive bursts of the service being received.

Currently, two approaches are implemented for supporting lower bit rate services as described in DVB-H (Digital Video Broadcast-Handheld) Implementation Guidelines. (See; ETSI TR 102 377 V1.2.1 (2005-11); Digital Video Broadcasting (DVB); DVB-H Implementation Guidelines section 10.1.1 Service aspects). The first approach implements low bit rate services by packing some other (higher bit rate) service together with a low bit rate service into the same bursts. In this manner, it is possible to keep the burst intervals short for low bit rate services. This method (short bursts occurring frequently) may optimize service access time but sacrifices comprises power savings. The power used to decode the low bit rate service would be relatively high as a receiver needs to decode the entire burst to obtain the bits from the low bit rate service.

The second approach involves utilizing bursts separated by a long off-time period. For example, the low bit rate service may be packed totally in its own burst. However, this approach provides a long waiting time to fill the burst and, hence, the burst interval becomes extremely long. This may be disturbing, e.g., in handover situations and at least in channel zapping (changing the RF channel) situations, where the waiting time could become very long before access for the service.

Therefore, a more efficient method of transmitting lower bit rate services with fast access time and maximum power savings capability in digital broadcast networks would be advancement in the art.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In an aspect of the invention, one or more pilot symbols which have known characteristics are included as first symbols of digital broadcast frames. The pilot symbols, which can be decoded without having to resort to trial and error methods, contain parameters for the rest of the signal.

Low bit rate services are allocated to time slots following the pilot symbols used for synchronization and signaling allowing for fast access times with maximum power saving capabilities. The low bit rate services may include digital broadcast radio services, traffic information, advertisements, text TV type services, and program guides or parts thereof.

In another aspect of the invention, a user terminal wakes up just before the first pilot symbol and receives the data allocated for the low bit rate services. The user terminal may power "off" for the remaining time slots which are allocated for higher bit services to conserve power.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
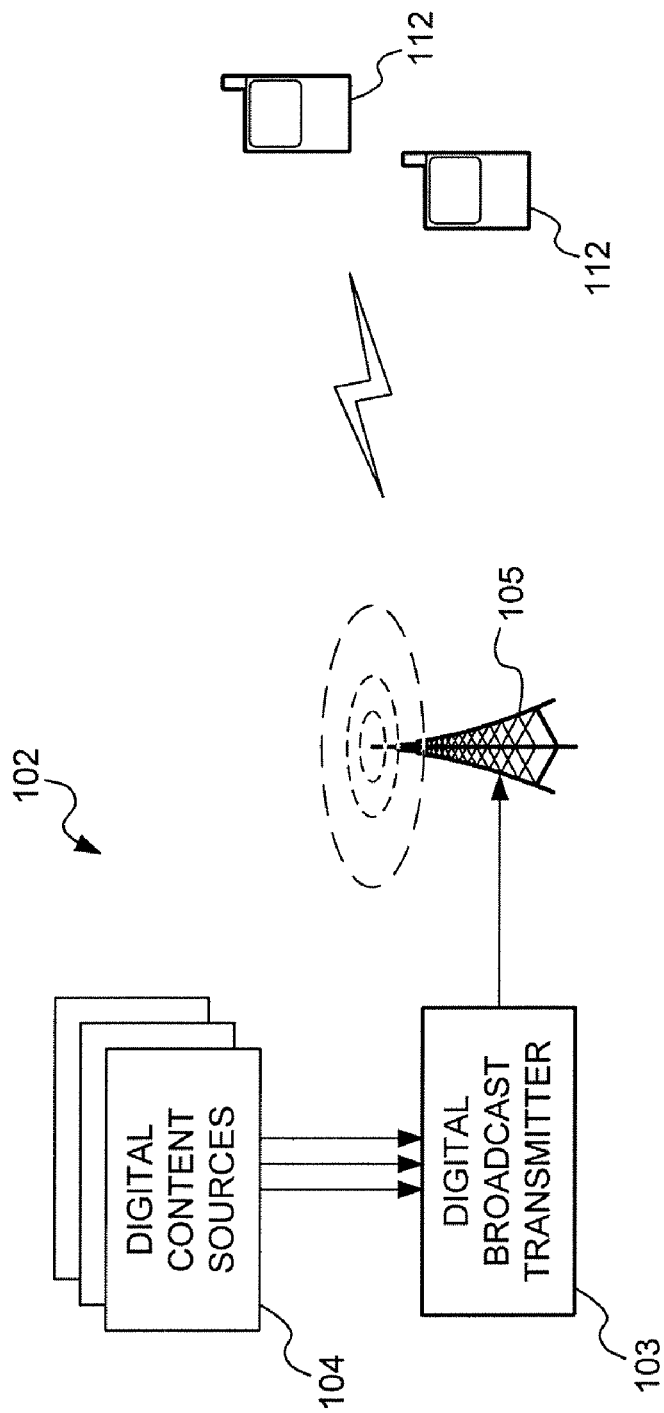
FIG. 1 illustrates a suitable digital broadband broadcast system in which one or more illustrative embodiments of the invention may be implemented.

FIG. 1 illustrates a suitable digital broadband broadcast system 102 in which one or more illustrative embodiments may be implemented. Systems such as the one illustrated here may utilize a digital broadband broadcast technology, for example DVB-H (or next generation DVB-H2) networks or DVB-T (or next generation DVB-T2) networks. Examples of other digital broadcast standards which digital broadband broadcast system 102 may utilize include Digital Video Broadcast—Terrestrial (DVB-T), Integrated Services Digital Broadcasting—Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple digital content data streams from multiple digital content sources 104. The digital content data streams may be in various embodiments IP streams. The processed digital content may then be passed to digital broadcast tower 105 (or other physical transmission component) for wireless transmission. Ultimately, mobile terminals or devices 112 may selectively receive and consume digital content originating from digital content sources 104.

Figure 2:
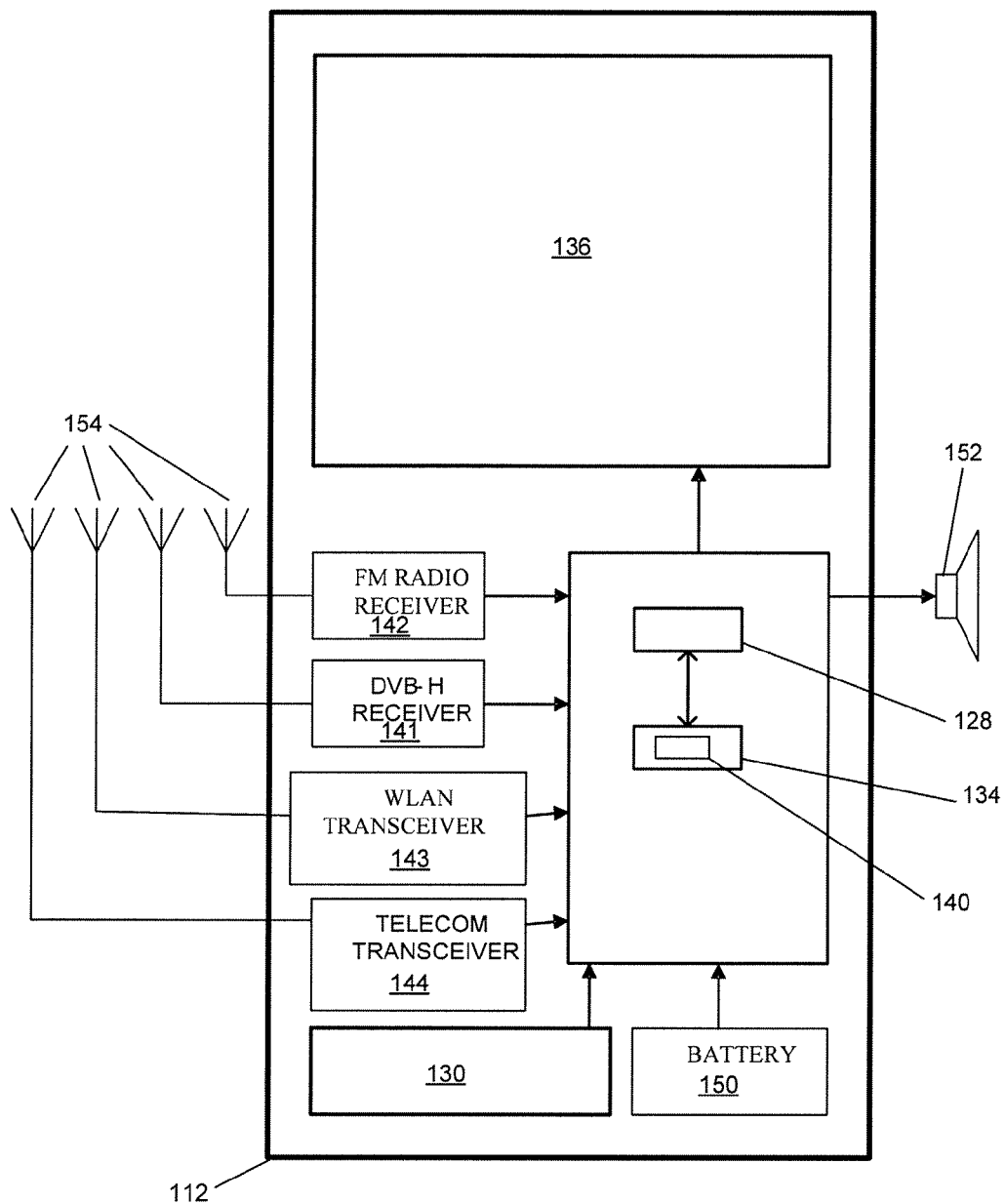
FIG. 2 illustrates an example of a mobile device in accordance with an aspect of the invention.

As shown in FIG. 2, mobile device 112 may include processor 128 connected to user interface 130, memory 134 and/or other storage, and display 136, which may be used for displaying video content, service guide information, and the like to a mobile-device user. Mobile device 112 may also include battery 150, speaker 152 and antennas 154. User interface 130 may further include a keypad, touch screen, voice interface, one or more arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H or DVB-T, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-Satellite (DVB-S), or DVB-Terrestrial (DVB-T). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting), FLO (Forward Link Only) or DIRECTV. Additionally, the digital transmission may use time division multiplexing or be time sliced (any form of time division multiplex), such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an electronic service guide may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital Video Broadcasting-Handheld (DVB-H). The DVB-H is designed to deliver 10 Mbps of data to a battery-powered terminal device.

DVB transport streams deliver encoded audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

As stated above, the ESG fragments may be transported by IPDC over a network, such as for example, DVB-H to destination devices. The DVB-H may include, for example, separate audio, video and data streams. The destination device must then again determine the ordering of the ESG fragments and assemble them into useful information.

Encapsulation of DSP packets, in accordance with at least one aspect of the invention, results in reduced overhead when compared to MPEG-2 TS or Generic Stream Encapsulation (GSE) because, for example, IP data has a single encapsulation mechanism.

In conventional DVB, there is MPE and MPEG-2 transmission stream. In Digital Video Broadcast—Satellite—Second Generation (DVB-S2), there is Generic Stream Encapsulation (GSE) and baseband frame (BBframe). Generic Streams (GS) are a kind of input stream in DVB-S2. GS can be used either in Packetized mode with fixed-size packets, or in Continuous mode, which is a stream of octets, not having any structure or packet boundaries. The Generic Stream Encapsulation (GSE) protocol, which is under definition within the Generic Data Broadcasting & Service Information Protocols (GBS) group of DVB, provides an efficient mean for encapsulating IP and other network layer packets over the generic Stream profile of the DVB-S2 physical layer.

In DVB-S2, a transmission frame consists of a 90-bit physical layer header providing a preamble and identifying the Modulation Coding (ModCod) used. The payload of a physical layer frame is known as a baseband frame (BBframe) and includes a 10 byte signalling header, which is followed by the BBframe payload. The size of this payload depends on the ModCod that was selected and can be up to 8 KB, significantly larger than an MPEG-2 TS Packet.

Figure 3:
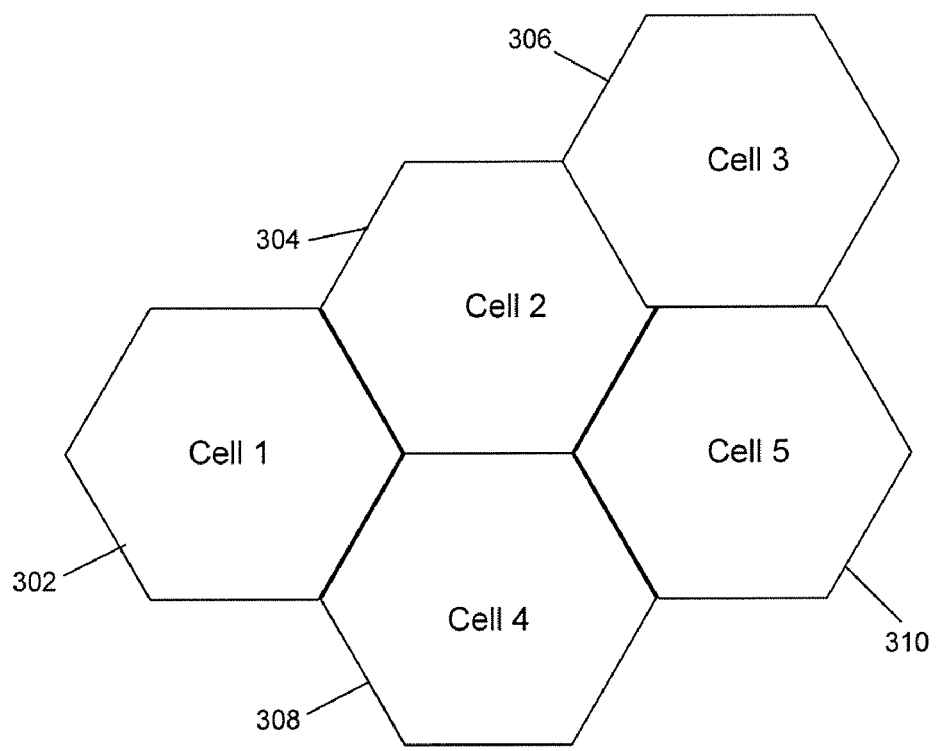
FIG. 3 illustrates an example of cells, schematically, each of which may be covered by a different transmitter in accordance with an aspect of the invention.

In a typical communication system, a cell may define a geographical area that may be covered by a transmitter. The cell may be of any size and may have neighboring cells. FIG. 3 illustrates schematically an example of cells, each of which may be covered by a different transmitter. In this example, Cell 1 (302) represents a geographical area that is covered by a transmitter for a communication network. Cell 2 (304) is next to Cell 1 (302) and represents a second geographical area that may be covered by a different transmitter. Cell 2 (304) may, for example, be a different cell within the same network as Cell 1 (302). Alternatively, Cell 2 (304) may be in a network different from that of Cell 1 (302). Cells 1, 3, 4, and 5 (302, 306, 308, and 310) are neighboring cells of Cell 2 (304), in this example.

Figure 4:
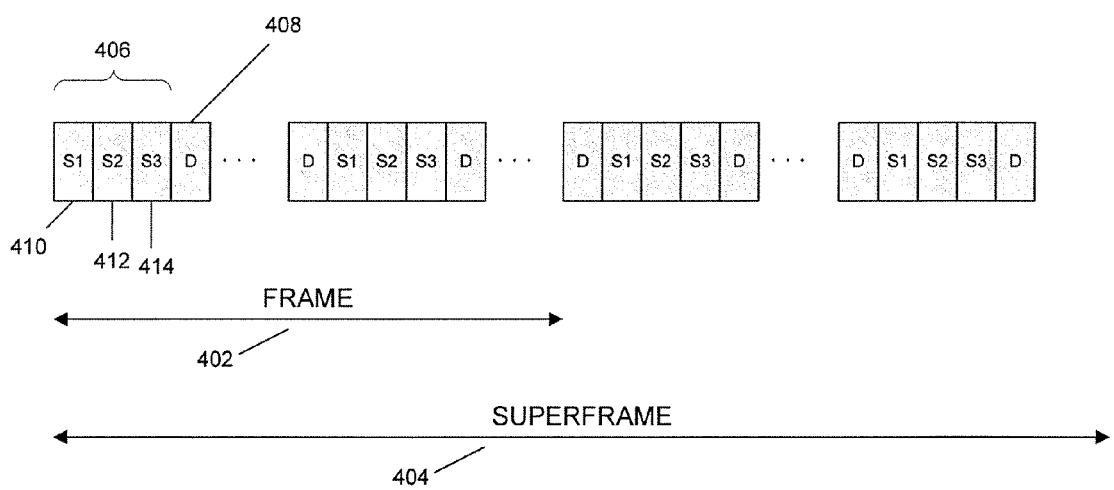
FIG. 4 illustrates an exemplary frame and superframe of symbols in accordance with an aspect of the invention.

FIG. 4 illustrates a frame 402 and superframe 404 of symbols, synchronization symbols, S1-S3 (406), used for channel searches and service discovery, and data D (408) in accordance with an aspect of the invention. The symbols may comprise a first symbol 410 that may be used to identify signal type. In addition, the symbols S1-S3 (406) may be used for detecting an offset from a radio channel center frequency. The symbols may comprise a second symbol 412 that may carry data relating to modulation parameters that are used in subsequent data symbols. In another embodiment, the symbols may comprise a third symbol 414 that may be used for channel estimation. Those skilled in the art will realize that numerous additional symbols may be included in a frame such as frame 420.

Figure 5:
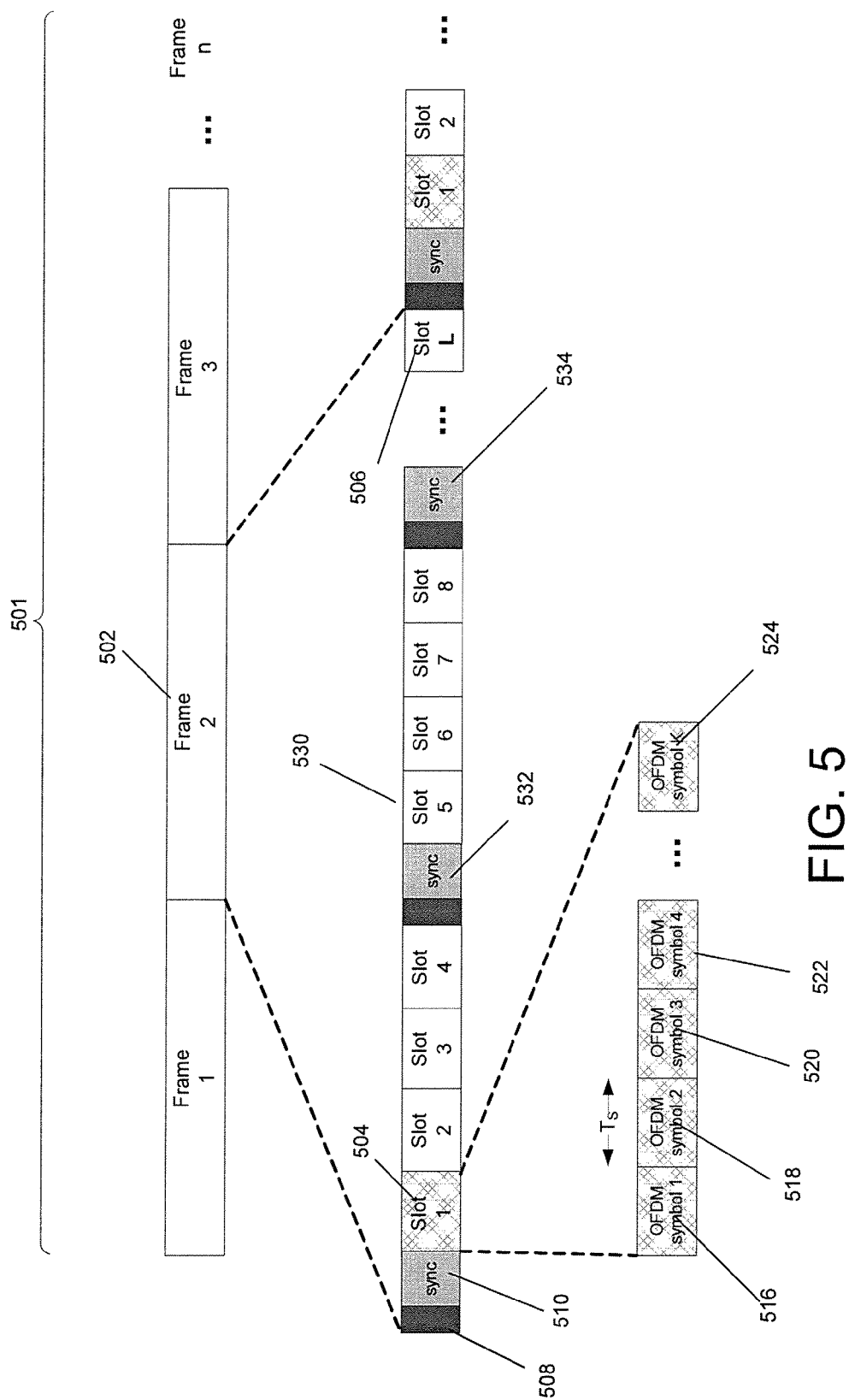
FIG. 5 illustrates an exemplary frame and slot structure in accordance with one or more aspects of the invention.

In accordance with an aspect of the invention, a frame structure may comprise a number of n frames 501 which may be repeated as shown in FIG. 5. In FIG. 5, a frame 502 may consist of L slots and one or more synchronization symbols. For example, frame 2 (502) includes slots 1 (504) through slot L (506).

Frame 2 (502) may include a pre-synchronization symbol 508 and a synchronization/signaling symbol 510. Frame 2 (502) may include other types of synchronization symbols that may be found in TDM structures having pilot symbols sequences that are repeated relatively frequently. These symbol sequences may be repeated regularly but also the repetitions may be irregular as far as their locations are known to upper layer controls.

As illustrated in FIG. 5, low bit rate services may be located adjacent or near the synchronization symbols as shown with respect to slot 1 (504). Each time slot may include several OFDM (orthogonal frequency division multiplexing) symbols, typically from a few symbols up to some tens of symbols. The services are allocated to these time slots so that one or more slots are used for a service. For example, time slot 1 (504) includes a number of OFDM symbols 1 through k (516 through 524).

If a low bit rate channel is requested then the control unit may allocate, for example, slot 1 (504) of frame 2 (502) for this service. In this exemplary embodiment, 1/NL part of the net capacity may be allocated for this low bit rate channel (if all slots would use the same modulation parameters). For instance, if N=64 and L=32 and net total capacity is 5 Mbits/s this would lead to a service channel with 2.44 kbit/s bit rate. These figures may be selected differently leading to other numbers. Also it may be possible that each time slot may have its own modulation and error correction parameters and then the above calculation may need to be adjusted.

Also it is possible to define frame structures where frames belong to superframes such as shown in FIG. 5. Then one low bit rate channel may be present only in one time slot of one frame of one superframe.

In another aspect of the invention, several synchronization symbols may be located in each frame. Low bit rate channels may be allocated to other time slots following the synchronization symbols if the requested capacity would justify such an approach, i.e. that the higher bit rate, which is resulting from this would correspond to the need. For example, additional low bit rate services may be allocated to slot 5 (530) and slot L (506) after synchronization symbols 532 and 534.

Figure 6:
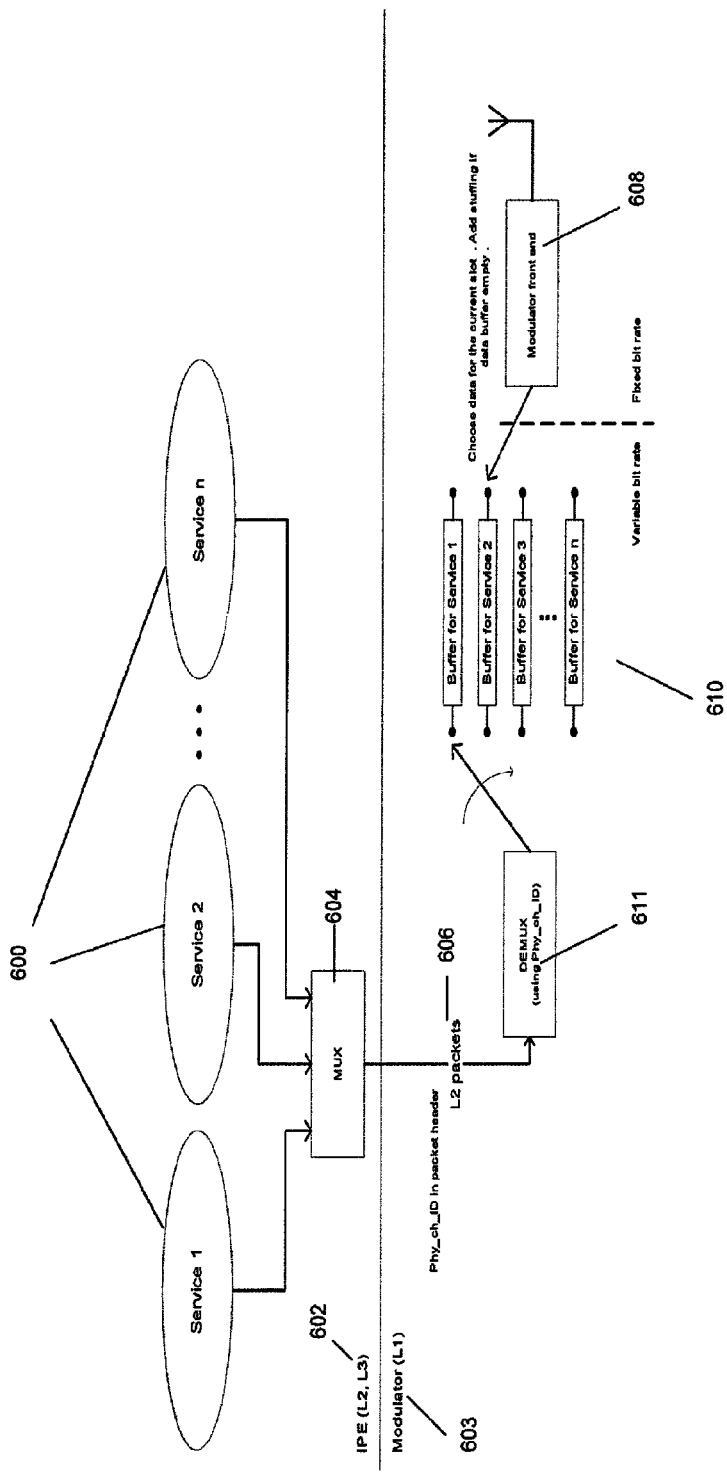
FIG. 6 illustrates an exemplary mapping of physical channels into time-division multiplexed slots in a modulator, in accordance with at least one aspect of the invention.

FIG. 6 illustrates an exemplary implementation of mapping physical channels or services into TDM slots and frames. In FIG. 6, low bit rate services are mapped into the slots right after the synchronization symbol. One physical channel can carry one or more logical channels, but one logical channel can not be divided between multiple physical channels.

In FIG. 6, using an Internet Protocol Encapsulator (IPE) 602, the services 600 are multiplexed 604 into a stream of L2 packets 606. In the modulator 608, there is a buffer 610 for each physical channel, and L2 packets are written into the corresponding buffer according to Phy_ch_id. The front end of the modulator then forms a TDM slot by selecting data from one physical channel buffer. The selection may be performed according to the parameters defining the physical channel-to-slot mapping.

L2 packets are not sent to the modulator with a fixed clock rate specified by the modulator bit rate as is done in the DVB-T transport stream. Therefore, buffers are needed as an interface between the variable and the fixed bit rate parts of the modulator. An alternative is to move buffers and some other functionality of the modulator to the IPE. In this case, the IPE forms the TDM slots and sends them to the modulator with a fixed clock rate.

Figure 7:
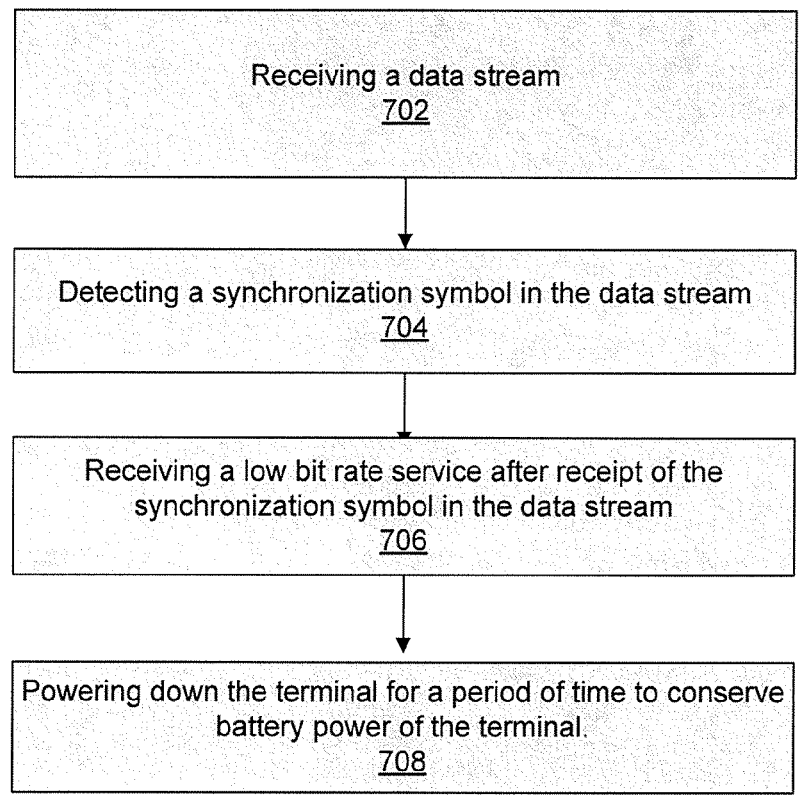
FIG. 7 illustrates an exemplary flow chart for receiving a low bit rate service in accordance with one or more aspects of the invention.

FIG. 7 illustrates an exemplary flow chart for receiving a low bit rate service in accordance with one or more aspects of the invention. The low bit rate service may include a digital broadcast radio service, traffic information, advertisements, text TV type services, and program guides or parts thereof. Those skilled in the art will realize that the low bit rate services listed above are merely exemplary and that other low bit rate services are envisioned.

In FIG. 7 at step 702, a data stream may be received at a user terminal. The user terminal may be a mobile terminal or cellular telephone. Those skilled in the art will realize that the approach of implementing low bit rate channels may also be utilized in fixed reception home TVs (DVB-T2) or other communication devices in order to implement power saving in household environments and is not limited to mobile devices. For example, the receiver could receive EPG as background/standby and with low power consumption.

In step 704, at least one synchronization symbol may be detected in the data stream. A low bit rate service located in the data stream may be received after receipt of the synchronization symbol in step 706. The low bit rate service may be directly adjacent the synchronization symbol in the data stream. In step 708 upon receipt of the low bit rate service, the user terminal may be powered down for a period of time to conserve battery power of the user terminal.

Figure 8:
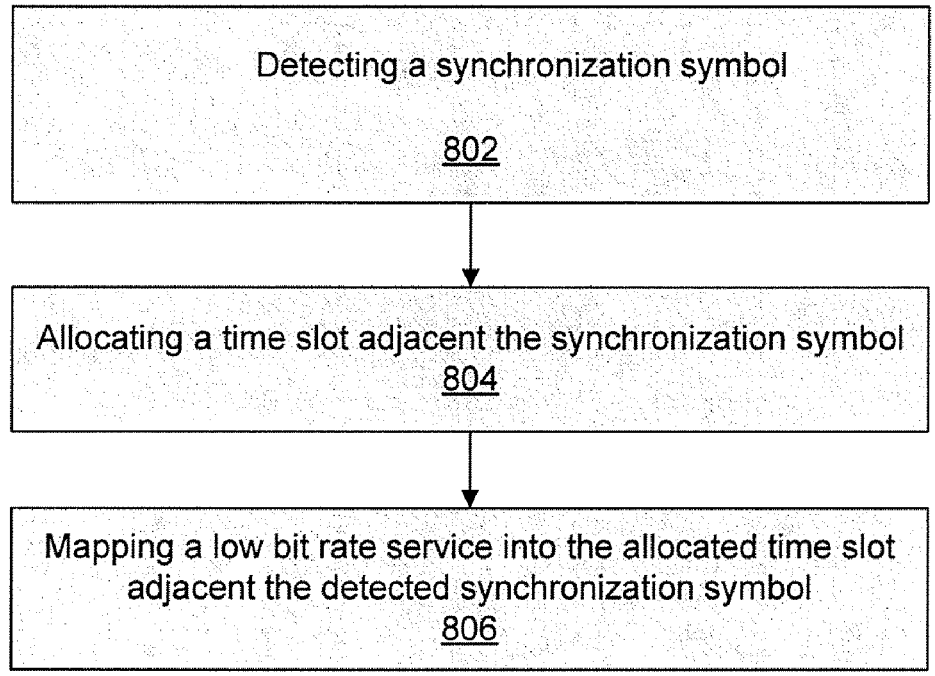
FIG. 8 illustrates a flow chart showing steps for mapping services such as low bit rate services into TDM slots in accordance with one or more aspects of the invention.

FIG. 8 illustrates a flow chart showing steps for mapping services such as low bit rate services into TDM slots in accordance with one or more aspects of the invention. In FIG. 8 at step 802, a synchronization symbol may be detected. In an encapsulator such as an IP encapsulator (IPE), services may be multiplexed into a stream of link layer packets. Time slots such as TDM slots may be allocated adjacent a synchronization symbol as shown in step 804. In step 806, a low bit rate service may be mapped into the allocated time slot adjacent the detected synchronization symbol.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC) and the like.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:
   receiving a data stream at a terminal over a wireless communications channel;
   detecting, by the terminal, a synchronization symbol in the data stream, wherein the synchronization symbol is a first symbol of a frame, and wherein the frame comprises a second synchronization symbol;
   obtaining, by the terminal, a low bit rate service included in the data stream after receipt of the synchronization symbol in the data stream and by using information carried by the synchronization symbol; and
   upon receipt of the low bit rate service, powering down the terminal for a period of time to conserve battery power of the terminal.

2. The method of claim 1, wherein the data stream further comprises a high bit rate service.

3. The method of claim 1, wherein a pre-synchronization symbol precedes the synchronization symbol.

4. The method of claim 1, wherein the low bit rate service comprises a digital broadcast radio service.

5. The method of claim, 1 wherein the terminal comprises a mobile device.

6. The method of claim 1, wherein the data stream is broadcasted using a digital video broadcasting transmission.

7. The method of claim 1, wherein the low bit rate service is adjacent to the synchronization symbol in the data stream.

8. An apparatus comprising:
   at least one processor; and
   at least one memory having stored therein machine executable instructions that
   when executed by the at least one processor, cause the apparatus to:
      receive a data stream at the apparatus over a wireless communications channel;
      detect a synchronization symbol in the data stream, wherein the synchronization symbol is a first symbol of a frame, and wherein the frame comprises a second synchronization symbol;
      obtain a low bit rate service included in the data stream after receipt of the synchronization symbol in the data stream and by using information carried by the synchronization symbol; and
      upon receipt of the low bit rate service, power down the apparatus for a period of time to conserve battery power of the apparatus.

9. The apparatus of claim 8, wherein the data stream further comprises a high bit rate service.

10. The apparatus of claim 8, wherein a pre-synchronization symbol precedes the synchronization symbol.

11. The apparatus of claim 8, wherein the low bit rate service comprises digital broadcast radio services.

12. The apparatus of claim 8, wherein the low bit rate service is adjacent to the synchronization symbol in the data stream.

13. An apparatus comprising:
at least one processor; and
at least one memory having stored therein machine executable instructions, that when executed by the at least one processor, cause the apparatus to:
detect a synchronization symbol, wherein the synchronization symbol is a first symbol of a frame, and wherein the frame comprises a second synchronization symbol;
allocate a time slot adjacent to the synchronization symbol; and
map a low bit rate service into the allocated time slot adjacent to the detected synchronization symbol.

14. The apparatus of claim 13, wherein a pre-synchronization symbol precedes the synchronization symbol.

15. A method comprising:
detecting, by a processor, a synchronization symbol, wherein the synchronization symbol is a first symbol of a frame, and wherein the frame comprises a second synchronization symbol;
allocating, by the processor, a time slot adjacent to the synchronization symbol; and
mapping, by the processor, a low bit rate service into the allocated time slot adjacent to the detected synchronization symbol.

16. The method of claim 15, wherein a pre-synchronization symbol precedes the detected synchronization symbol.

17. The method of claim 15, wherein the low bit rate service comprises a digital broadcast radio service.

18. The method of claim 15, wherein the synchronization symbol comprises an orthogonal frequency division multiplexing symbol.

19. A non-transitory computer-readable medium storing computer-executable instructions that when executed by a processor, cause an apparatus to:
receive a data stream at the apparatus over a wireless communications channel;
detect a synchronization symbol in the data stream, wherein the synchronization symbol is a first symbol of a frame, and wherein the frame comprises a second synchronization symbol;
obtain a low bit rate service included in the data stream after receipt of the synchronization symbol in the data stream and by using information carried by the synchronization symbol; and
upon receipt of the low bit rate service, power down the apparatus for a period of time to conserve battery power of the apparatus.

20. The method of claim 1, further comprising:
identifying a signal type associated with the information carried by the synchronization symbol.

21. The method of claim 1, further comprising:
determining a modulation parameter pertaining to a data symbol used for the low bit rate service.

22. The apparatus of claim 8, the instructions, when executed by the at least one processor, further cause the apparatus to:
identify a time slot adjacent to the synchronization symbol; and
extract the low bit rate service from the time slot adjacent to the detected synchronization symbol.

23. The apparatus of claim 13, wherein the allocated time slot is included in one or more time slots of the frame.

24. The method of claim 15, wherein the allocated time slot is included in one or more time slots of the frame.

25. The method of claim 1, wherein the low bit rate service occupies a first time slot of a plurality of time slots after the synchronization symbol, the first time slot being adjacent to the synchronization symbol in the data stream, and wherein a high bit rate service occupies one or more remaining time slots after the first time slot.

26. The apparatus of claim 8, wherein the low bit rate service occupies a first time slot of a plurality of time slots after the synchronization symbol, the first time slot being adjacent to the synchronization symbol in the data stream, and wherein a high bit rate service occupies one or more remaining time slots after the first time slot.

* * * * *